United States Patent [19]

Koeller

[11] Patent Number: 5,415,420
[45] Date of Patent: May 16, 1995

[54] CART CAN RETAINER

[76] Inventor: James E. Koeller, P.O. Box 1028, 308 Maple St., Brookings, Oreg. 97415

[21] Appl. No.: 106,531

[22] Filed: Aug. 16, 1993

[51] Int. Cl.6 .............................. B62B 1/04; B62B 1/26
[52] U.S. Cl. ............................... 280/47.28; 280/47.26; 248/99; 248/215; 248/227
[58] Field of Search ............... 280/47.28, 47.26, 47.17, 280/47.131, 47.19, 47.2; 248/98, 95, 99, 97, 100, 101, 129, 133, 135, 907, 215, 227, 290, 297.2, 301, 304, 307; 414/446, 448, 457; 16/114 R, DIG. 41

[56] References Cited

U.S. PATENT DOCUMENTS

| | | | |
|---|---|---|---|
| 345,090 | 7/1886 | Walter | 280/47.2 |
| 551,639 | 12/1895 | Johnson | 248/99 |
| 666,045 | 1/1901 | Beeson | 248/99 |
| 711,561 | 10/1902 | Franden, Jr. | 248/99 |
| 1,428,180 | 9/1922 | More | 280/47.28 |
| 1,875,248 | 8/1932 | Lynch | 280/47.19 X |
| 2,806,711 | 9/1957 | Jacobs | 280/47.19 |
| 2,838,190 | 6/1958 | Stevens | 414/448 |
| 3,784,138 | 1/1974 | Herling et al. | 280/47.26 X |
| 3,992,034 | 11/1976 | Smith, Sr. et al. | 248/98 |
| 4,452,468 | 6/1984 | Eads et al. | 280/47.19 X |
| 5,104,135 | 4/1992 | Sheets | 280/47.19 |
| 5,123,666 | 6/1992 | Moore | 280/47.19 X |
| 5,139,219 | 8/1992 | Navarro | 248/99 |
| 5,193,842 | 3/1993 | Fontenot | 280/47.26 X |

Primary Examiner—Margaret A. Focarino
Assistant Examiner—Carla Mattix

[57] ABSTRACT

A cart can retainer for aiding in the movement of heavy loads by steadying them is disclosed. This device includes a flat clip welded together with a curved rod and is used in connection with devices such as a hand truck or garden cart. This device also may be adapted to use extention rods and elastic bands to further encircle and ease in transporting the load.

4 Claims, 5 Drawing Sheets

CART CAN RETAINER

BACKGROUND OF THE INVENTION

1. Field of the Invention

The present invention relates generally to carrying devices, and more particularly, to devices which aid in the stabilizing of a load to be transported.

2. Description of the Prior Art

Aids for transporting a load generally are well known. For example, U.S. Pat. No. 5,017,080 dated May 21, 1991 discloses a hand truck including an elongated frame attached to a wheel assembly. Similarly, U.S. Pat. No. 3,674,164 dated Jul. 4, 1972 discloses a hand truck having a swingably mounted wheel and axle assembly and a supporting frame. Likewise, U.S. Pat. No. 4,793,623 dated Dec. 27, 1988 discloses a load gripping handcart including a wheel supported frame with a projectionless load abutment surface. U.S. Pat. Des. No. 318,356 dated Jul. 16, 1991 discloses an ornamental design for a hand truck. Finally, U.S. Pat. No. 3,499,658 discloses a tiltable hand truck having a frame and primary wheels. Such hand trucks are useful but do not include removable device for steadying the load carried on them. A need exists, therefore, for a device which may be easily transported and used on any hand truck or the like for steadying the load carried. This will prevent unnecessary swaying and spilling of the load.

The foregoing need is met by the present invention as will be made apparent from the following description thereof. Other advantages of the present invention over the prior art also will be rendered evident.

SUMMARY OF THE INVENTION

To achieve the foregoing and other advantages, the present invention, briefly described, provides a cart can retainer for aiding in the movement of heavy loads by steadying them. This device includes a fiat clip welded together with a curved rod and is used in connection with devices such as a hand truck or garden cart. This device also may be adapted to use extension rods and elastic bands to further encircle the load.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved cart can retainer which has all of the advantages of the prior art and none of the disadvantages.

It is another object of the present invention to provide a new an improved cart can retainer which may be easily and efficiently manufactured and marketed.

It is a further objective of the present invention to provide a new and improved cart can retainer which is of durable and reliable construction.

An even further object of the present invention is to provide a new and improved cart can retainer which is susceptible of a low cost of manufacture with regard to both materials and labor, and which accordingly is then susceptible of low prices of sale to the consuming public, thereby making such cart can retainer available to the buying public.

Still yet a further object of the present invention is to provide a new and improved cart can retainer which will be detachable and easily transportable.

It is still a further object of the present invention to provide a new and improved cart can retainer which will be easily attached and steady the load to be transported.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

Figure 1:
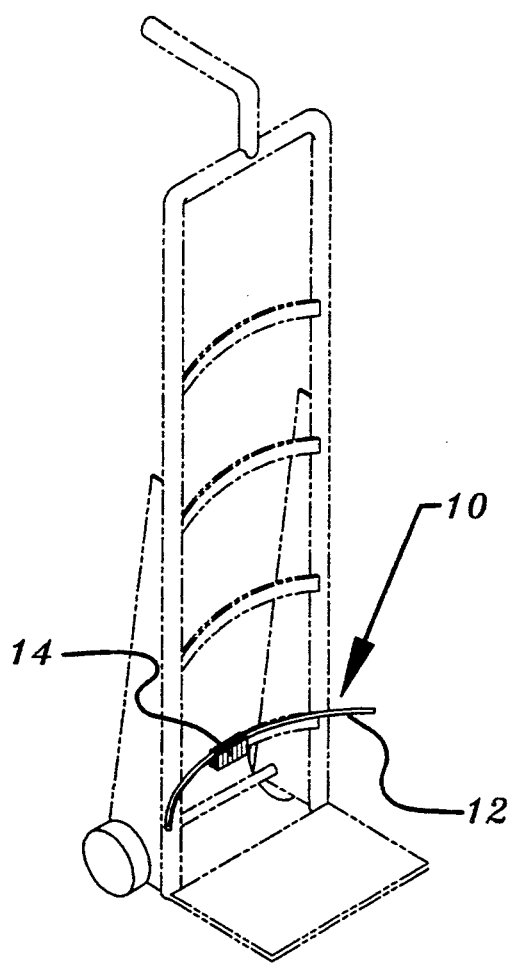
FIG. 1 is a perspective view showing the cart can retainer in connection with a hand truck.
Figure 2:
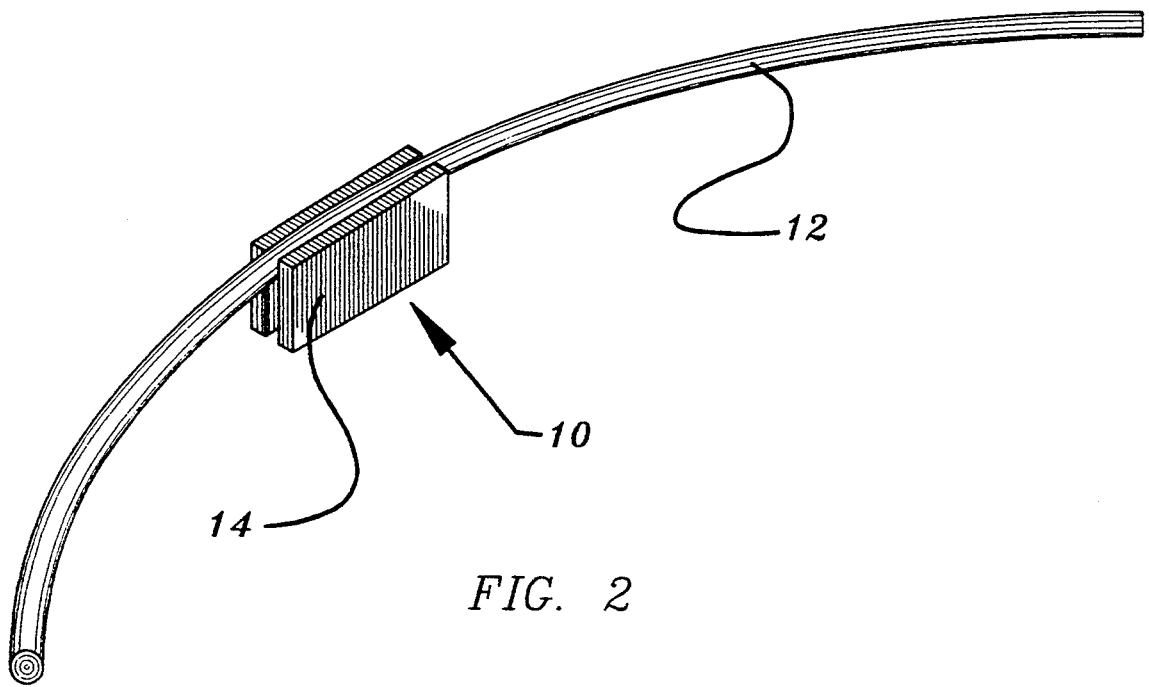
FIG. 2 is a .perspective view showing the cart can retainer of the present invention.
Figure 3:
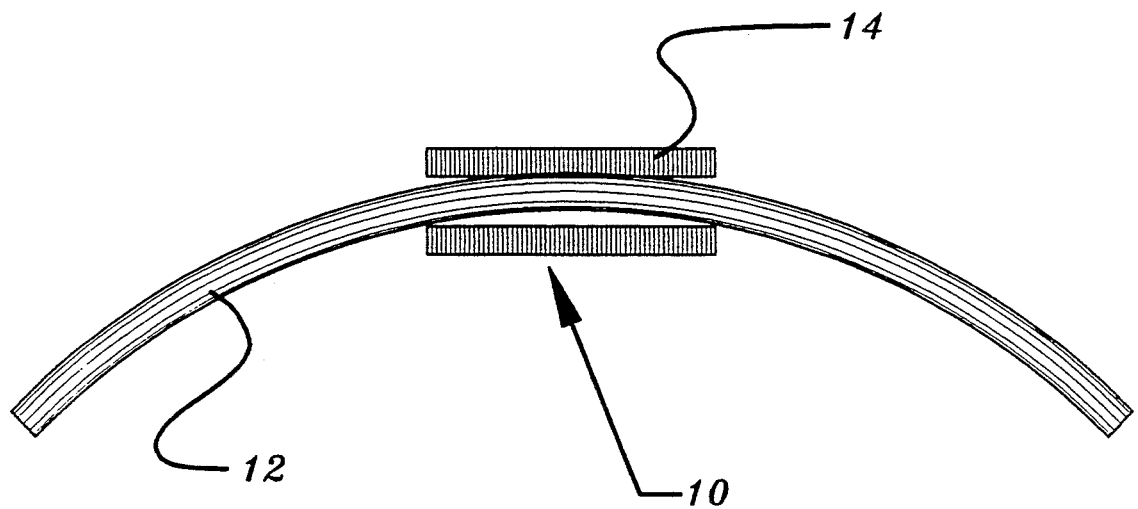
FIG. 3 is an elevational view showing the top side of the cart can retainer of FIG. 2.
Figure 4:
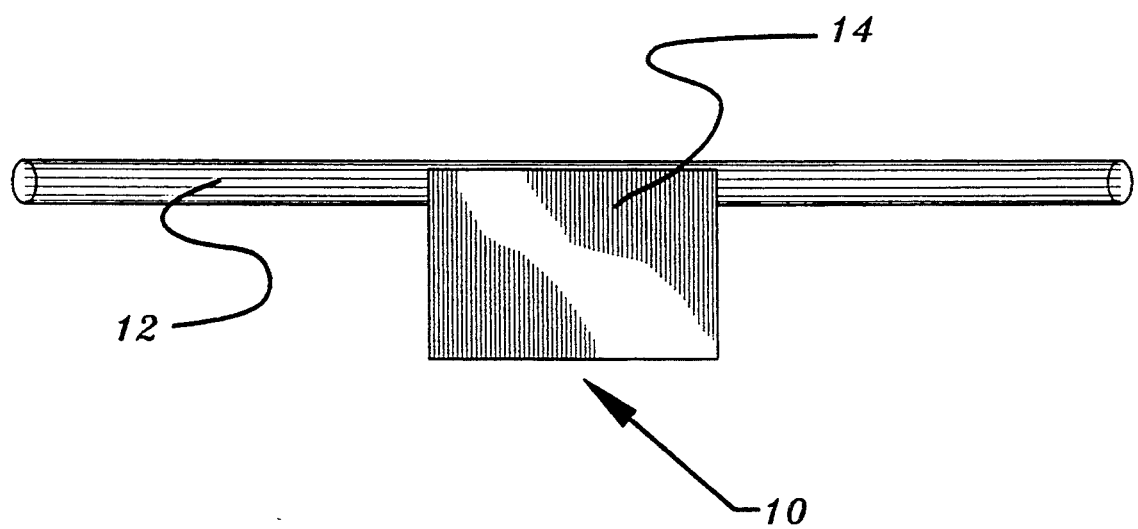
FIG. 4 is a perspective view of the cart can retainer of the present invention.

With reference now to the drawings, a new and improved cart can retainer embodying the principles and concepts of the present invention will be described.

Turning initially to FIGS. 1-4, there is shown a first exemplary embodiment of the cart can retainer designated by reference numeral 10. In its preferred form, the cart can retainer 10 comprises generally a curved rod 12. The curved rod 12 has a concave interior surface which contacts the load and an opposed convex exterior surface. This rod may be comprised of steel or plastic and has an optimum diameter of 5/16 inches. Welded to the rod 12 at a central location is a flat clip 14 comprising a pair of spaced substantially flat plate sections 14a and 14b substantially as depicted. The clip is fitted over the cross bar or rail of a conventional cart or other similar means so that the opposed ends of curved rod extend outwardly beyond the side rails of the cart as shown schematically in FIG. 1.

Figure 5:
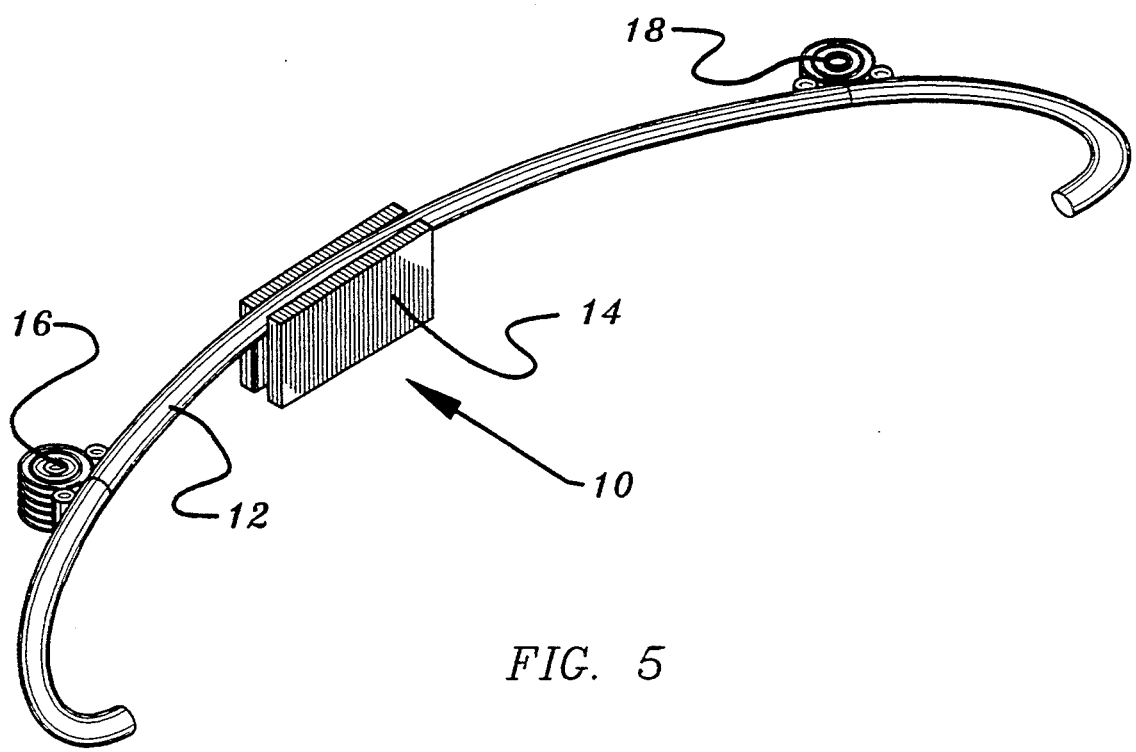
FIG. 5 is a perspective view of the cart can retainer of the present invention including extension rods.
Figure 6:
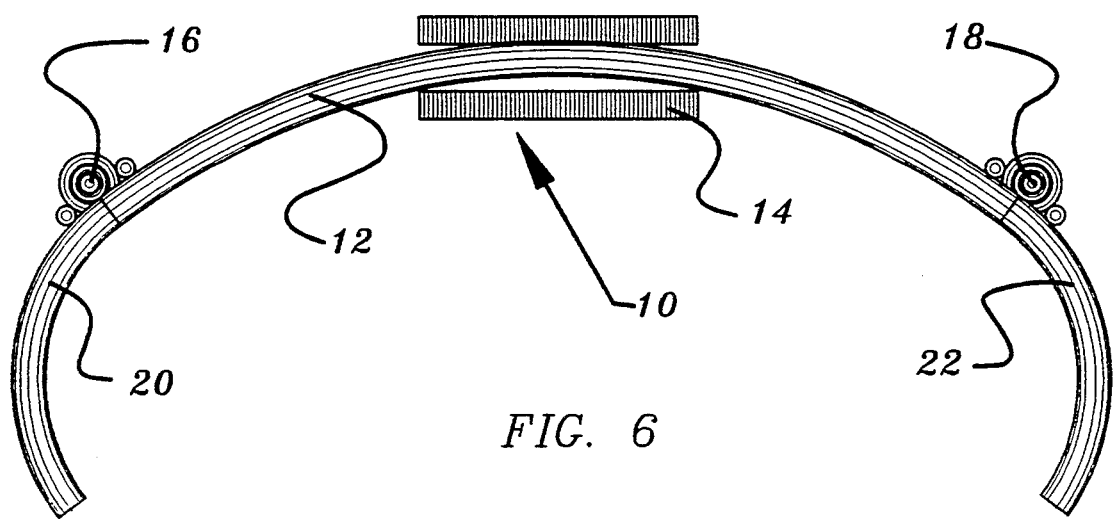
FIG. 6 is an elevational view showing the top side of the cart can retainer of FIG. 5.

FIG. 5 and 6 illustrate an optional embodiment of the cart can retainer in which a spring or hinge 16 is attached at both ends of the curved rod 12. Attached to the springs or hinges 16 and 18 are extension rods 20 and 22 which allow the cart can retainer to grasp an object more firmly. The extension rods are likewise made of steel or plastic and are optimally 5/16 inches in diameter.

Figure 7:
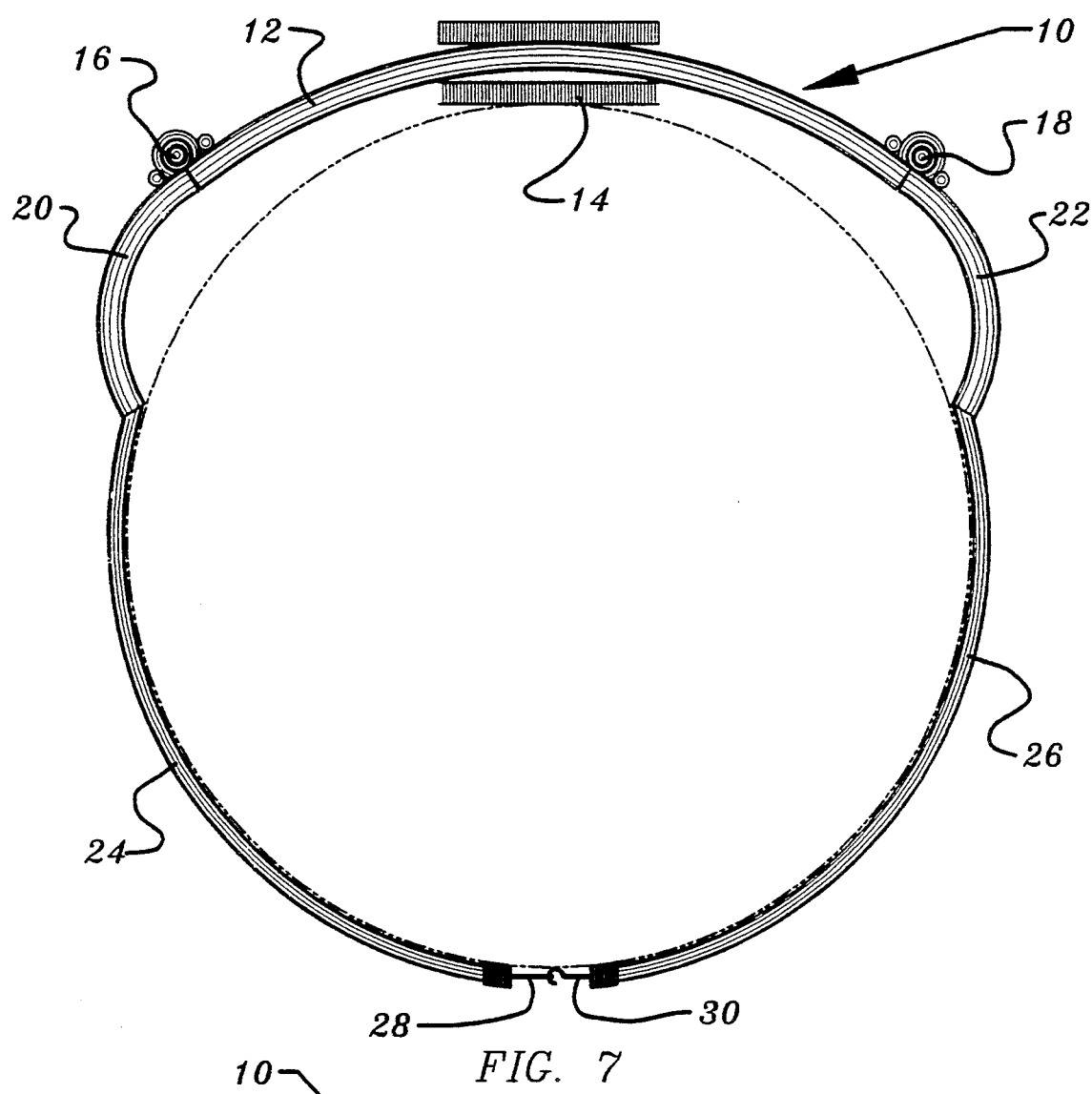
FIG. 7 is an elevational view of the cart can retainer of FIG. 6 including elastic bands in a functional mode.
Figure 8:
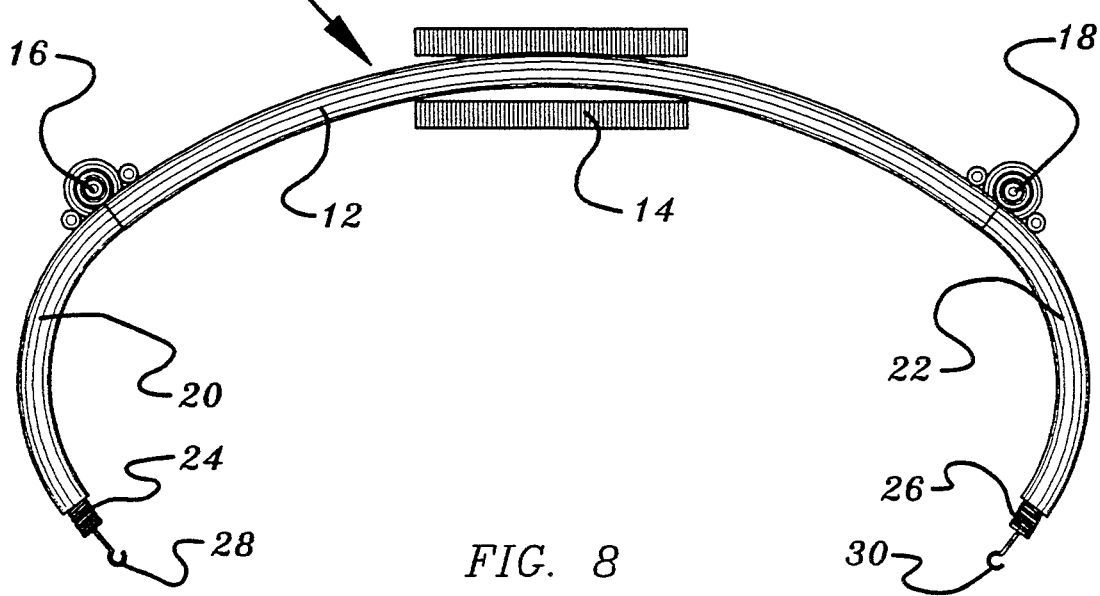
FIG. 8 is an elevational view of FIG. 7 with the elastic bands in a relaxed mode.

FIGS. 7 and 8 also illustrate an embodiment of the cart can retainer of FIGS. 5 and 6 including an elastic material band or bungee cord 24 and 26 having hooks 28 and 30 respectively connected at the end of the elastic bands. The elastic bands 24 and 26, when not in use, retract into their respective extension rods 20 and 22.

Figure 9:
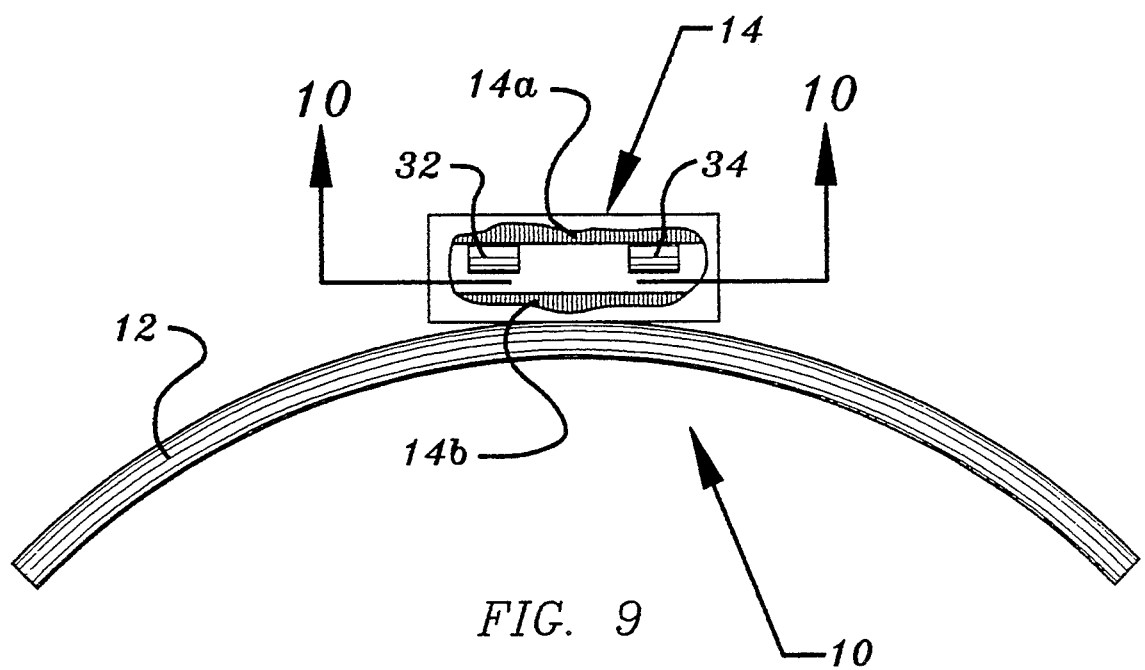
FIG. 9 is a top view of an alternatively preferred embodiment of the invention wherein the clip portion thereof is shown partially broken away to reveal additional holding means.
Figure 10:
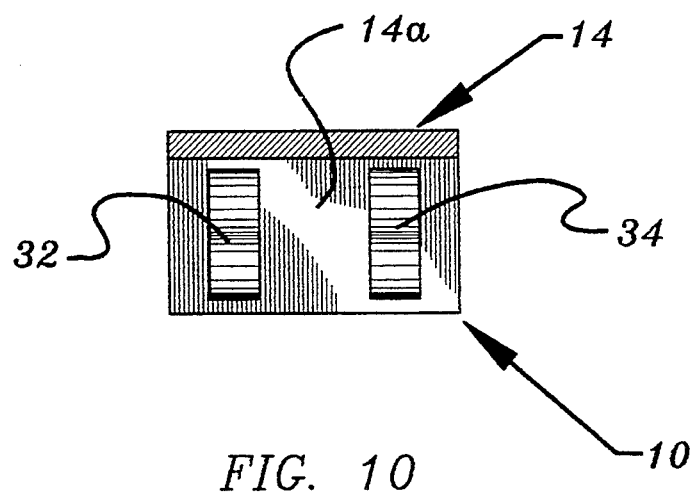
FIG. 10 is a cross-sectional view taken along lines 10—10 of FIG. 9.
Figure 11:
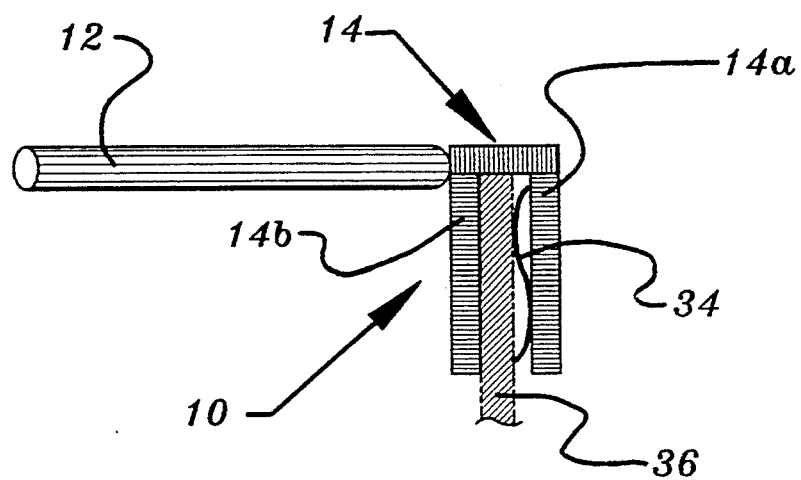
FIG. 11 is a side view of the embodiment of FIGS. 9 and 10 showing the engagement thereof with a cross-bar of a cart.

FIGS. 9-11 show yet a further alternatively preferred embodiment of the invention wherein dip 14 is provided with holding means for securing attachment of the retainer 10 to a cart. The preferred form of holding means comprises a pair of slightly curved, resilient spring clips 32 and 34 suitably attached to the inside surface of one of the plate sections 14a or 14b. As shown in FIG. 11, the clips resiliently and positively engage cross-bar 36 of a cart thereby securely maintaining the retainer 10 in its working position. Spring clips 32 and 34 facilitate affixing the retainer to the selected cross-bar 36 (or removal thereof) with a simple snap fitting motion as will be evident from the foregoing description.

In operation, the flat clip is attached at a convenient position on a garden truck, hand cart, or other means for moving a can. The can is then placed on the hand truck and at a position with its curved side resting upon and within the curved rod. The extension rods may be flexed to engage the garbage can or other similar object. The hooks on the ends of the elastic material (bungee cords) are then attached together around the can to be moved. The hand truck or other cart can then be moved to any place desired without the possibility of the can attached becoming unsteady or falling off. This device may be used on any type of load, not necessarily a garbage can, such as boxes and the like.

It is apparent from the above that the present invention accomplishes all of the objectives set forth by providing a new and improved cart can retainer.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. A cart can retainer for use with a cart, said retainer comprising:

a curved rod having a center section, and first and second ends, with a concave interior surface and an opposed convex exterior surface; and, a flat clip for attaching said curved rod to a portion of said cart, said flat clip comprising first and second flat plate sections, with said first flat plate section being mounted to said concave interior surface of said curved rod and said second flat plate section being mounted to said convex exterior surface, said flat plate sections being substantially parallel to one another, spaced from one another, and extending downwardly from said curved rod so as to receive said portion of said cart therebetween to removably mount said retainer to said cart.

2. A cart can retainer for use with a cart, said retainer comprising:

a curved rod having a center section, and first and second ends, with a concave interior surface and an opposed convex exterior surface;

a flat clip for attaching said curved rod to a portion of said cart, said flat clip comprising first and second flat plate sections, with said first flat plate section being mounted to said concave interior surface of said curved rod and said second flat plate section being mounted to said convex exterior surface, said flat plate sections being substantially parallel to one another, spaced from one another, and extending downwardly from said curved rod so as to receive said portion of said cart therebetween to removably mount said retainer to said cart;

a first spring mounted to said first end of said curved rod;

a second spring mounted to said second end of said curved rod;

a first rigid extension rod mounted to said first spring so as to be resiliently pivotally mounted to said first end of said curved rod; and, a second rigid extension rod mounted to said second spring so as to be resiliently pivotally mounted to said second end of said curved rod, said extension rods being substantially arcuately shaped so as to at least partially encompass an object present on said cart so as to further secure said object on said cart.

3. A cart can retainer for use with a cart, said retainer comprising:

a curved rod having a center section, and first and second ends, with a concave interior surface and an opposed convex exterior surface;

a flat clip for attaching said curved rod to a portion of said cart, said flat clip comprising first and second flat plate sections mounted to said opposed surfaces of said curved rod, said flat plate sections being spaced so as to receive said portion of said cart therebetween to removably mount said retainer to said cart;

a first spring mounted to said first end of said curved rod;

a second spring mounted to said second end of said curved rod;

a first hollow, rigid extension rod mounted to said first spring so as to be resiliently pivotally mounted to said first end of said curved rod;

a second hollow, rigid extension rod mounted to said second spring so as to be resiliently pivotally mounted to said second end of said curved rod, said extension rods being substantially arcuately shaped so as to at least partially encompass an object present on said cart so as to further secure said object on said cart;

a first elastic band mounted within said first hollow extension rod, said first elastic band being selectively extensible from said first hollow extension rod; and, a second elastic band mounted within said second hollow extension rod, said second elastic band being selectively extensible from said second hollow extension rod, said elastic bands having distal ends thereof with hooks coupled to said distal ends, said elastic bands being extensible about said object with said hooks being coupleable together to retain said elastic bands about said object to further secure said object to said retainer and said cart.

4. The cart can retainer of claim 3, and further comprising a pair of spring clips positioned between said flat plate sections, said spring clips being resiliently deformable during insertion of said portion of said cart between said flat plate sections and operable to frictionally retain said portion therebetween, thereby further securing said retainer to said cart.

* * * * *